(12) United States Patent
Li et al.

(10) Patent No.: US 11,483,479 B1
(45) Date of Patent: Oct. 25, 2022

(54) TARGETED IMAGE STABILIZATION

(71) Applicant: Amazon Technologies, Inc., Seattle, WA (US)

(72) Inventors: Jingqiang Li, Austin, TX (US); Georgios Skolianos, Seattle, WA (US); Shuai Yue, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/484,447

(22) Filed: Sep. 24, 2021

(51) Int. Cl.
   *H04N 5/232* (2006.01)
(52) U.S. Cl.
   CPC ..... *H04N 5/23287* (2013.01); *H04N 5/23258* (2013.01)
(58) Field of Classification Search
   None
   See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,630,924 B2 | 1/2014 | Groenevelt et al. |
| 8,688,598 B1 | 4/2014 | Shakes et al. |
| 9,473,747 B2 | 10/2016 | Kobres et al. |
| 10,623,727 B1* | 4/2020 | Frevert ................ H04N 5/2254 |
| 11,363,203 B2* | 6/2022 | Kimura .............. H04N 5/23287 |
| 2003/0002712 A1 | 1/2003 | Steenburgh et al. |
| 2004/0181467 A1 | 9/2004 | Raiyani et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2012/0284132 A1 | 11/2012 | Kim et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Cynthia Segura
(74) *Attorney, Agent, or Firm* — Athorus, PLLC

(57) ABSTRACT

When a lens assembly of an imaging device is subject to impacts, vibrations or other movements, and an optical axis of a lens assembly is varied as a result of the movements, blurring or pixel shifts may be reduced or eliminated at a targeted location within an image plane by shifting a lens of the lens assembly by a distance calculated based on an angle corresponding to the selected location, an angular difference between orientations of the optical axis, and a focal length of the imaging device. If the distance would result in a pixel shift at a center of the image plane in excess of a maximum allowable pixel shift, an alternate distance may be calculated based on the maximum allowable pixel shift, the angular difference between orientations of the optical axis, and the focal length of the imaging device.

20 Claims, 16 Drawing Sheets

(56) References Cited

U.S. PATENT DOCUMENTS

| | | |
|---|---|---|
| 2013/0076898 A1 | 3/2013 | Philippe et al. |
| 2013/0253700 A1 | 9/2013 | Carson et al. |
| 2014/0279294 A1 | 9/2014 | Field-Darragh et al. |
| 2015/0019391 A1 | 1/2015 | Kumar et al. |
| 2015/0073907 A1 | 3/2015 | Purves et al. |
| 2018/0059212 A1* | 3/2018 | Avitan .................... F41G 3/323 |
| 2021/0110538 A1* | 4/2021 | Themelis ............... G02B 7/001 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

\* cited by examiner

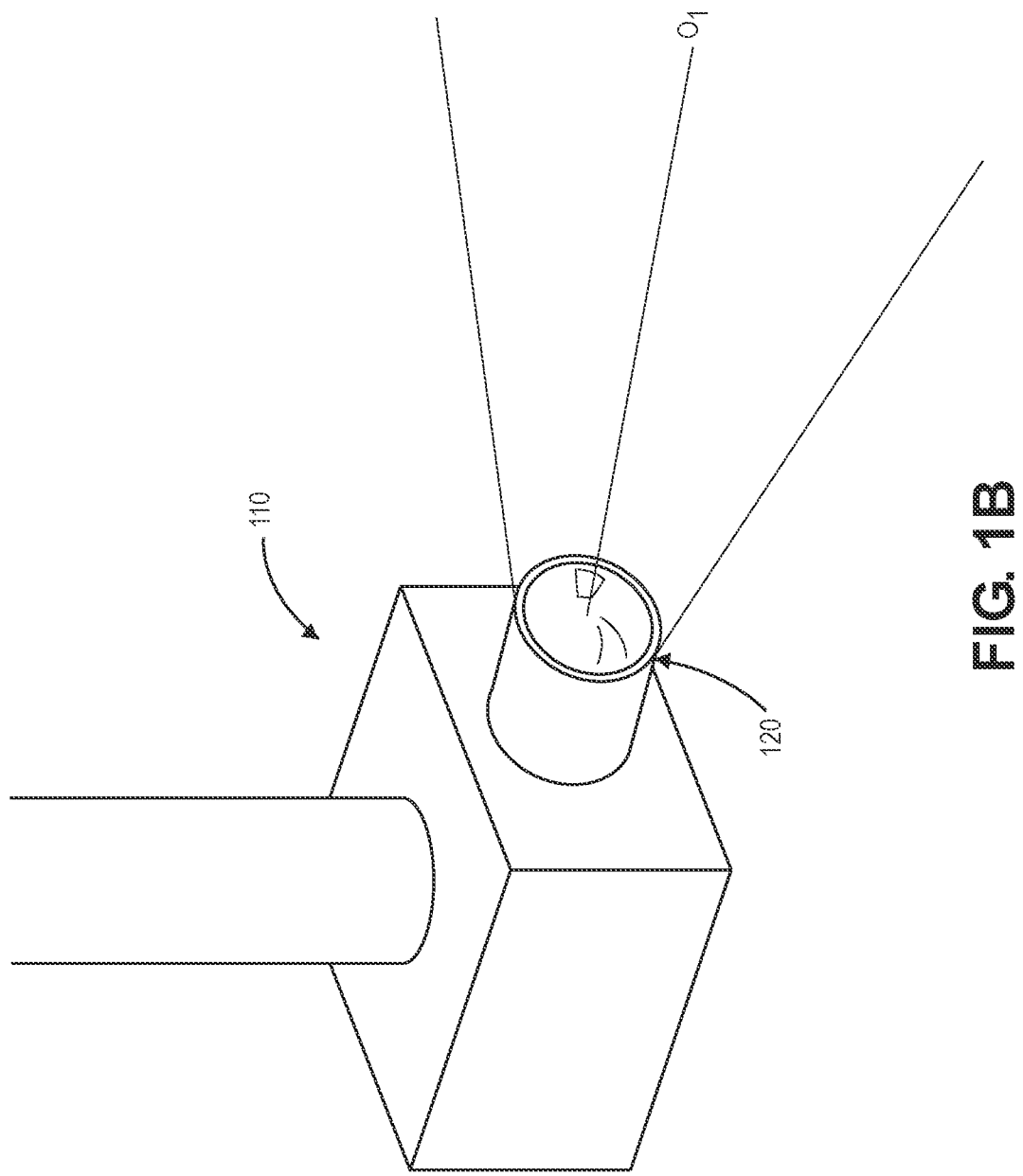

GIVEN θ AND T, CALCULATE
TARGETED LENS SHIFT $(\Delta L)_T$
TO RESULT IN ZERO PIXEL
SHIFT AT
$(\Delta L)_T = f \cdot \tan(\alpha - \theta) - f \cdot \tan(\theta)$ CALCULATE CENTER PIXEL
SHIFT $\delta h_C$ RESULTING FROM
TARGETED LENS SHIFT $(\Delta L)_T$ $\delta h_C = f \cdot \tan \theta - (\Delta L)_T$

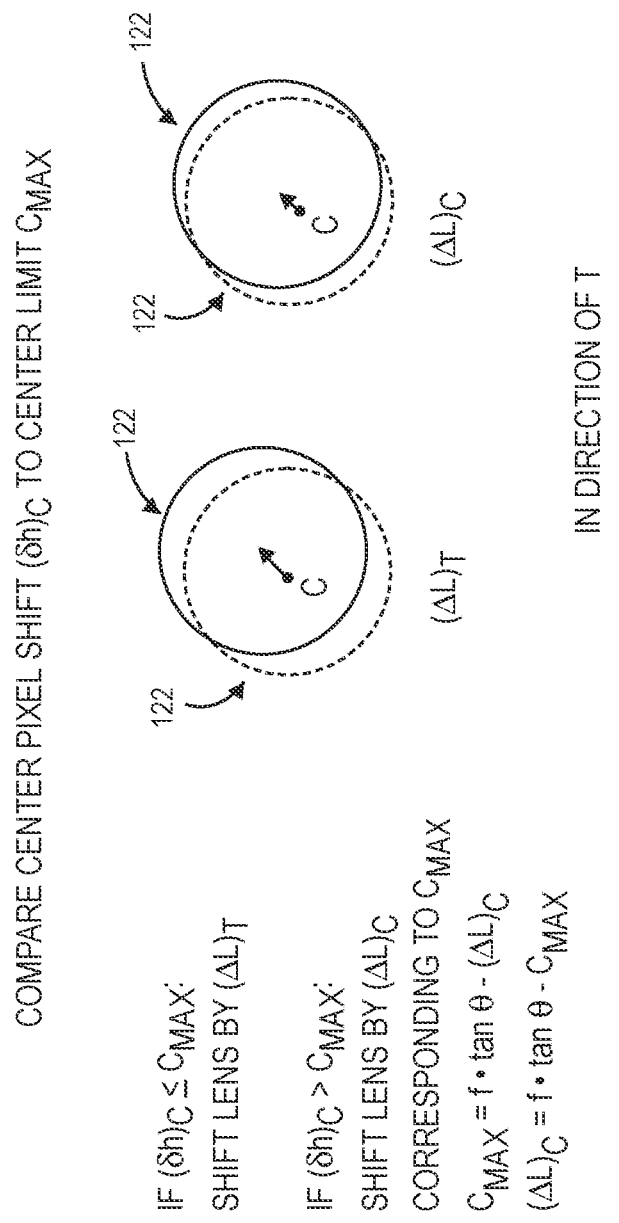

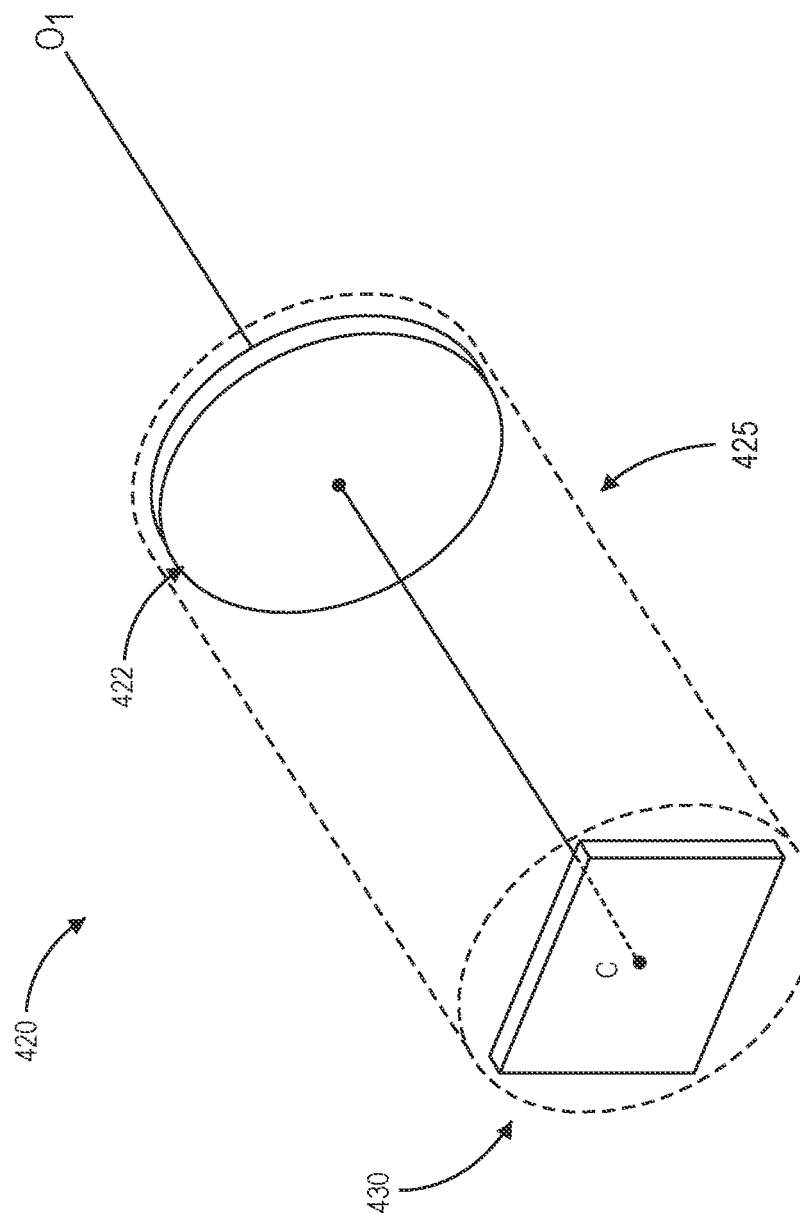

IMAGES CAPTURED PRIOR TO AND AFTER MOVEMENT OF LENS ASSEMBLY

TARGETED IMAGE STABILIZATION

BACKGROUND

Optical image stabilization processes are utilized to correct or compensate for blurring in images captured by cameras that results from movements (e.g., vibrations) of the cameras as the images are captured. Optical image stabilization processes operate by controlling or modifying a path of light passing through one or more lenses or lens assemblies and onto an image sensor of a camera.

Some optical image stabilization processes control or modify paths of light passing through lenses or lens assemblies by detecting vibrations or other movements of cameras, e.g., within directions perpendicular to optical axes of the cameras, and repositioning the lenses or other lens assemblies to correct for detected vibrations or other movements, e.g., in directions of yaw axes or pitch axes. Such processes are commonly directed to ensuring that a single location within an image, e.g., a center of the image, is free of blur, or is subject to blurring to a limited extent. As a result of such efforts, however, other locations within the image may be subject to blurring, as different view angles require lenses or lens assemblies to be shifted by different distances in order to bring different portions of a field of view into a blur-free condition.

BRIEF DESCRIPTION OF THE DRAWINGS

FIGS. 1A through 1G are views of aspects of one system for targeted image stabilization in accordance with implementations of the present disclosure.

FIGS. 4A through 4G are views of aspects of one process for targeted image stabilization in accordance with implementations of the present disclosure.

DETAILED DESCRIPTION

As is set forth in greater detail below, the present disclosure is directed to targeted image stabilization. More specifically, the systems and methods of the present disclosure are directed to systems and methods for stabilizing images that are captured by cameras that are subject to movements, e.g., vibrations, due to external factors or shocks. In some implementations, a change in orientation of an optical axis of a camera may be detected by one or more motion sensors or other systems provided in association with a lens assembly of the camera. A portion of an image plane (e.g., other than a center of the image plane) may be selected and targeted to ensure that adverse effects of the movements result in a minimal amount of blurring of images captured by the camera in locations corresponding to the portion of the image plane. Subsequently, a lens of the lens assembly may be moved, e.g., by servos or other motors, in a direction selected to eliminate or minimize blurring at the location of the targeted portion. Moreover, in some implementations, where a targeted portion of an image plane is other than a center of the image plane, an extent of blurring at that portion may be eliminated entirely, or minimized with respect to a standard for blurring at the center of the image plane, by selecting and executing an appropriate movement of a lens of a lens assembly.

Figure 1A:
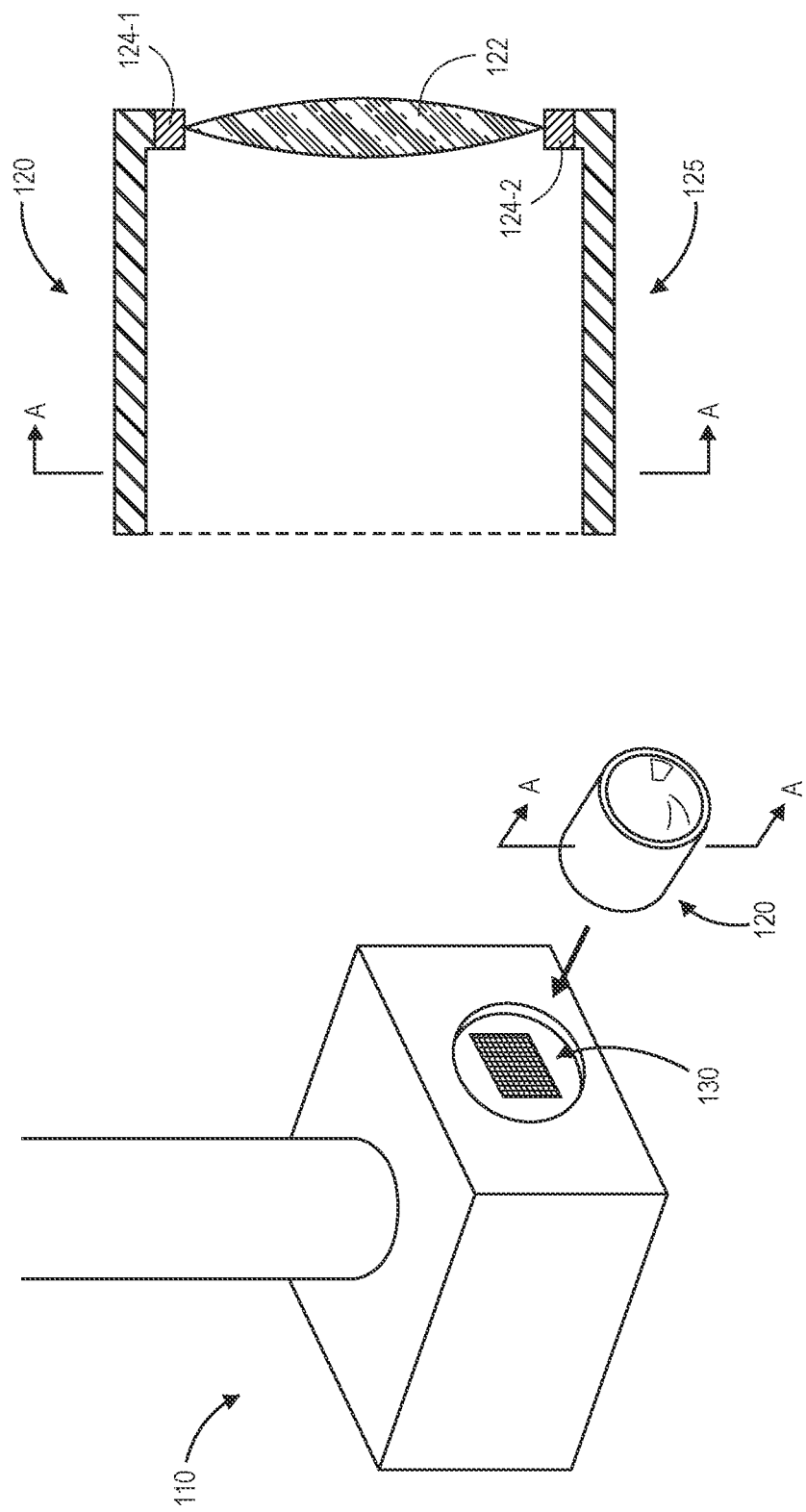

Referring to FIGS. 1A through 1G, views of aspects of one system for targeted image stabilization in accordance with implementations of the present disclosure are shown. As is shown in FIG. 1A, an imaging device 110 (e.g., a camera) includes a lens assembly 120 that may be releasably mounted to a housing or another surface of the imaging device 110, in alignment with an image sensor 130. The imaging device 110 may be any type or form of optical recording device that may be used to photograph or otherwise record imaging data within a materials handling facility or in any other location, and for any purpose. The imaging device 110 may be mounted in any specific location, such as above, below or alongside one or more inventory areas or stations for receiving or distributing items, or in any open or enclosed environment or space in which any number of actors (e.g., humans, other animals or machines) may execute one or more poses, gestures or other actions within one or more of their fields of view. In some implementations, the imaging device 110 may include one or more optical sensors, e.g., the image sensor 130, which may be color sensors (or grayscale sensors or black-and-white sensors) and/or depth sensors configured to capture visual imaging data (e.g., textures) or depth imaging data (e.g., ranges) to objects within one or more fields of view of the imaging device 110. Such sensors may include one or more photosensitive surfaces, filters, chips, electrodes, clocks, boards, timers or any other relevant features (not shown). In some implementations, the imaging device 110 may also include one or more memory or storage components, processors or transceivers (not shown). Additionally, the imaging device 110 may be configured to capture one or more still or moving images (e.g., streams of visual and/or depth images or image frames), along with any relevant audio signals or other information (e.g., position data), and also to communicate with any other computer devices over one or more networks, through the sending and receiving of digital data.

The lens assembly 120 may include a single lens, or any number of lenses that are coaligned with respect to the optical axis, and define a field of view extending forward of the lens assembly 120. The lens assembly 120 further includes at least two motors 124-1, 124-2 (e.g., servos) that may be coupled to the lens 122, or otherwise configured to move or translate the lens 122 in one or more directions within a plane that is normal or perpendicular to an optical axis. For example, in some implementations, one of the motors 124-1, 124-2 may be configured to move the lens 122 in a first direction normal to an optical axis, and another of the motors 124-1, 124-2 may be configured to move the lens 122 in a second direction that is normal to both the first direction and the optical axis. Alternatively, or additionally, the lens assembly 120 may include any number of other lenses, including one or more lenses that are stationary with respect to the housing or structure of the lens assembly 120, or with respect to an optical axis.

As is shown in FIG. 1B, the lens assembly 120 is mounted to the imaging device 110 in an initial state, and aligned with an optical axis in a first orientation $O_1$. The optical axis may be a principal axis, e.g., a roll axis, of the imaging device 110 and provides a degree of rotational symmetry to the imaging device 110.

Figure 1C:
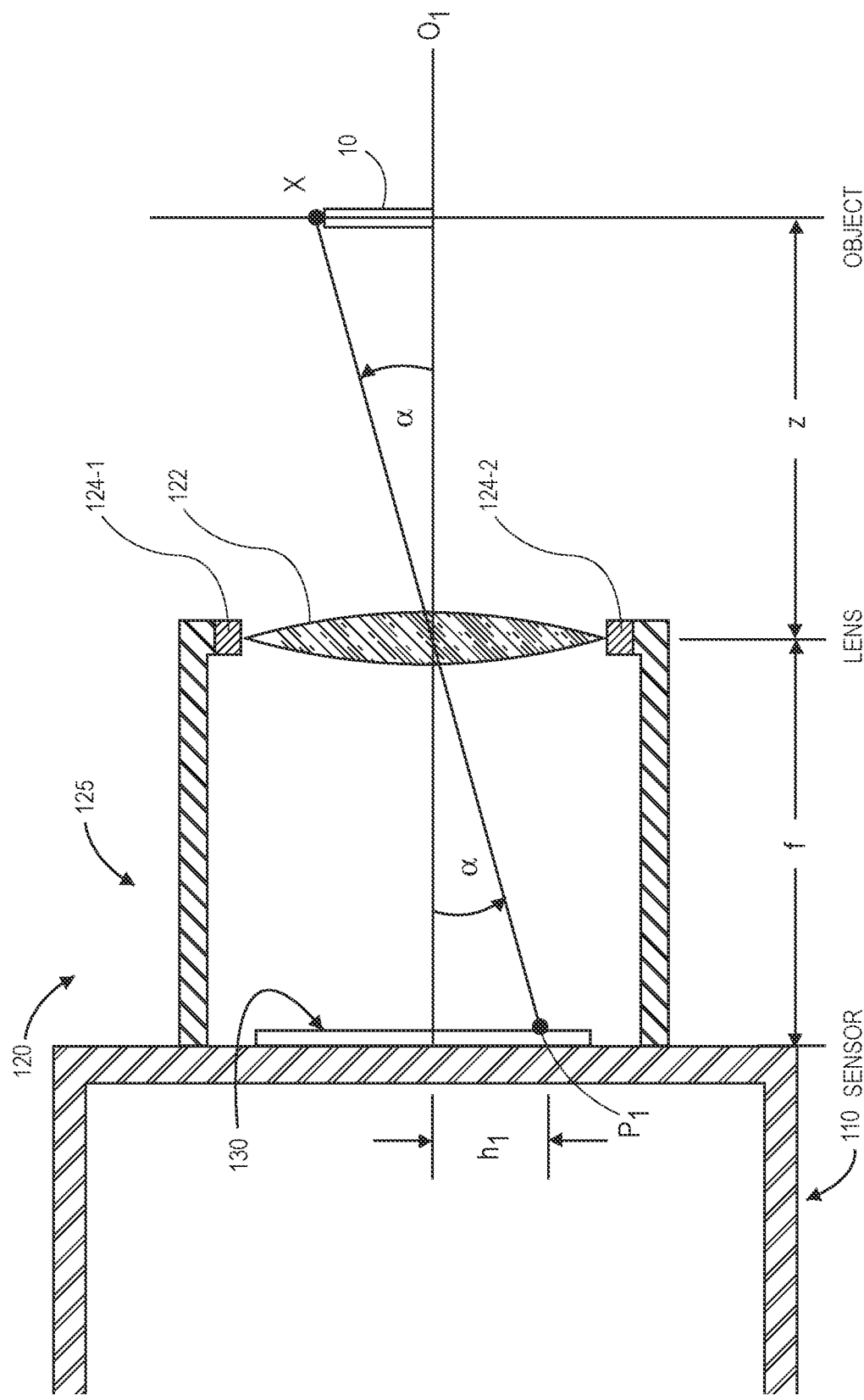

As is shown in FIG. 1C, the lens assembly 120 is mounted to the imaging device 110 in an initial state. The lens assembly 120 includes a lens 122 that is provided within a housing 125 or another structure and aligned with respect to the image sensor 130.

As is shown in FIG. 1C, the image sensor 130 is provided at a focal length f from the lens 122 with the lens assembly 120 mounted to the imaging device 110 in the initial state. In some implementations, the image sensor 130 may be a complementary metal oxide semiconductor (or "CMOS") image sensor or component thereof, a charge-coupled device (or "CCD") image sensor or component thereof, or any other type or form of image sensor or component thereof having a plurality of pixel sensors as well as amplifiers, switches, gates or any other relevant components for controlling exposure of the image sensor 130 to light and the conversion of charges or analog signals associated with such exposure to digital signals. Alternatively, the image sensor 130 may be provided at any other distance from the lens 122, and need not be provided at the focal length f from the lens 122. Additionally, as is also shown in FIG. 1C, at least a portion of an object 10 is provided at a range (or working distance) z from a front edge or leading edge of the lens 122.

As is also shown in FIG. 1C, a point X on an object 10 is projected onto a point $P_1$ on the image sensor 130. For example, light reflecting off the object 10 at the point X passes at an angle $\alpha$ through a center of the lens 122 to the point $P_1$ on the image sensor 130. Alternatively, light reflecting off the object 10 at various other points may also pass through the center of the lens 122 to points on the image sensor 130 at various angles other than the angle $\alpha$.

Figure 1D:
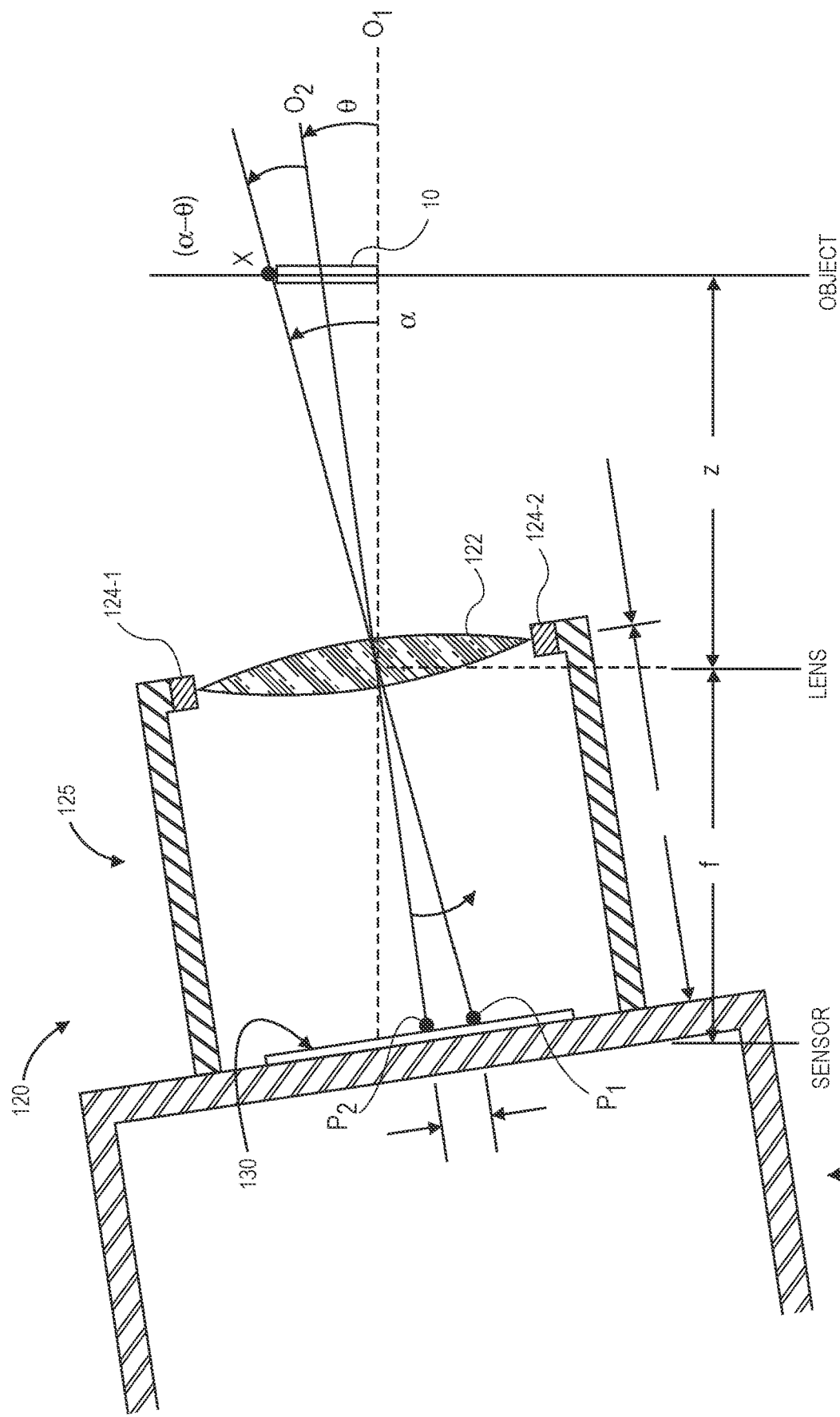

As is shown in FIG. 1D, the lens assembly 120 is in a state following a movement (e.g., a rotation) by an angle $\theta$, which causes the optical axis to move from the first orientation $O_1$ to a second orientation $O_2$. The movement of the lens assembly 120 may be caused by impacts to the imaging device 110, vibrations of the imaging device 110, or any other factors. The movement of the lens assembly 120 may be detected by any number of sensors provided in association with the imaging device 110, the lens assembly 120 or any other devices or systems. Accordingly, following the movement of the lens assembly 120 by the angle $\theta$, and as is shown in FIG. 1D, light reflecting off the object 10 at the point X passes at an angle ($\alpha-\theta$) through the center of the lens 122 to a point $P_2$ on the image sensor 130. The point $P_2$ is provided at a distance $\Delta h$ from the point $P_1$.

Figure 1E:
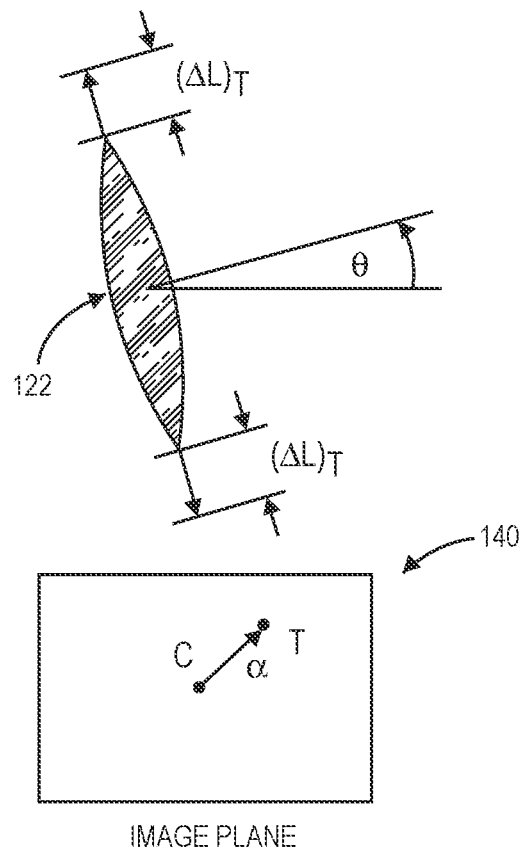
Figure 1F:
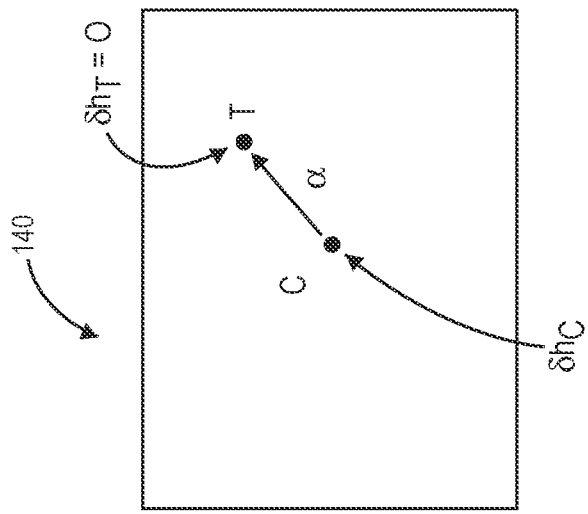

In accordance with implementations of the present disclosure, blurring following shifts of pixels at selected locations resulting from rotations or other movements of lens assemblies may be addressed by executing corresponding shifts of one or more lenses. In some implementations, a selected location within an image or an image plane may be targeted to eliminate blur, or to reduce blur to a maximum practicable extent, following a movement of a lens assembly for any reason. As is shown in FIG. 1E, given the movement of the lens assembly 120 by the angle $\theta$, which results in a rotation of the lens 122 by the angle $\theta$, a targeted lens shift $(\Delta L)_T$ may be calculated to eliminate or minimize blur at a selected location T on an image plane 140, which corresponds to the point X on the object 10 shown in FIGS. 1C and 1D. The point X is provided at an angle $\alpha$ with respect to center of the lens 122 and the first orientation $O_1$ of the optical axis, and at an angle ($\alpha-\theta$) with respect to the center of the lens 122 and the second orientation $O_2$ of the optical axis. For example, as is shown in FIG. 1E, the targeted lens shift $(\Delta L)_T$ is determined as a function of the focal length f, the angle ($\alpha-\theta$) and the angle $\theta$, according to Equation (1), below:

$$(\Delta L)_T = f \tan(\alpha-\theta) - f \tan \theta \qquad (1)$$

Where the targeted lens shift $(\Delta L)_T$ is calculated according to Equation (1), above, a pixel shift $\delta h_T$ representing blur at the selected location T resulting from the movement of the lens assembly 120 by the angle $\theta$ may be presumed to be zero, or approximately zero. As is shown in FIG. 1F, a corresponding pixel shift (or pixel error) $\delta h_C$ at a center C of the image plane 140 of the imaging device 110 resulting from the targeted lens shift $(\Delta L)_T$ may also be determined as a function of the focal length f, the angle $\theta$ and the targeted lens shift $(\Delta L)_T$, according to Equation (2), below:

$$\delta h_C = f \tan \theta - (\Delta L)_T \qquad (2)$$

Where a targeted lens shift would result in an unacceptable blur or pixel shift at a center of an image plane, however, an alternate lens shift that would maintain blurring or pixel shifting at the center of the image plane at an acceptable level, or below a threshold blur or pixel shift, may be determined, and the lens may be moved by the alternate lens shift as a result. As is shown in FIG. 1G, the pixel shift $\delta h_C$ at the center C of the image plane 140 resulting from an implementation of the targeted lens shift $(\Delta L)_T$, calculated according to Equation (2), may be compared to a maximum acceptable blur or pixel shift at the center C, or $C_{MAX}$. If the pixel shift $\delta h_C$ at the center C of the image plane 140 that would result from an implementation of the targeted lens shift $(\Delta L)_T$ is not greater than the maximum acceptable blur or pixel shift at the center C, or $C_{MAX}$, then the targeted lens shift $(\Delta L)_T$ may be implemented. For example, the lens 122 may be moved by a distance equal to the targeted lens shift $(\Delta L)_T$ calculated according to Equation (1) above and in a direction parallel to a line from the center C of the image plane to the selected location T using one or more motors, e.g., the motors 124-1, 124-2, which may be actuated by one or more controllers, actuators or other systems upon detecting the movement of the lens assembly 120 by the angle $\theta$.

If the pixel shift $\delta h_C$ at the center C of the image plane 140 that would result from the implementation of the targeted lens shift $(\Delta L)_T$ is greater than the maximum acceptable blur or pixel shift at the center C, or $C_{MAX}$, however, then an alternate lens shift, or $(\Delta L)_C$, may be calculated based on the maximum acceptable blur or pixel shift $C_{MAX}$, according to Equation (3), below:

$$(\Delta L)_C = f \tan \theta - C_{MAX} \qquad (3)$$

In such instances, the alternate lens shift $(\Delta L)_C$ may be implemented, e.g., by moving the lens 122 by a distance equal to the alternate lens shift $(\Delta L)_C$ calculated according to Equation (1) above, and in a direction of the selected location T using one or more motors, e.g., the motors 124-1, 124-2, which may be actuated by one or more controllers, actuators or other systems upon detecting the movement of the lens assembly 120 by the angle $\theta$.

Where the lens 122 is moved by the targeted lens shift $(\Delta L)_T$ and in the direction of the selected location T, the blur or pixel shift at the selected location T should be zero, or approximately zero, and the blur or pixel shift at the center C should be less than the maximum acceptable blur or pixel shift $C_{MAX}$. Where the lens 122 is moved by the alternate lens shift $(\Delta L)_C$ in the direction parallel to a line from the center C of the image plane to the selected location T, the blur or pixel shift at the selected location T is minimized, and the blur or pixel shift at the center C should be equal to the maximum acceptable blur or pixel shift $C_{MAX}$.

Figure 2:
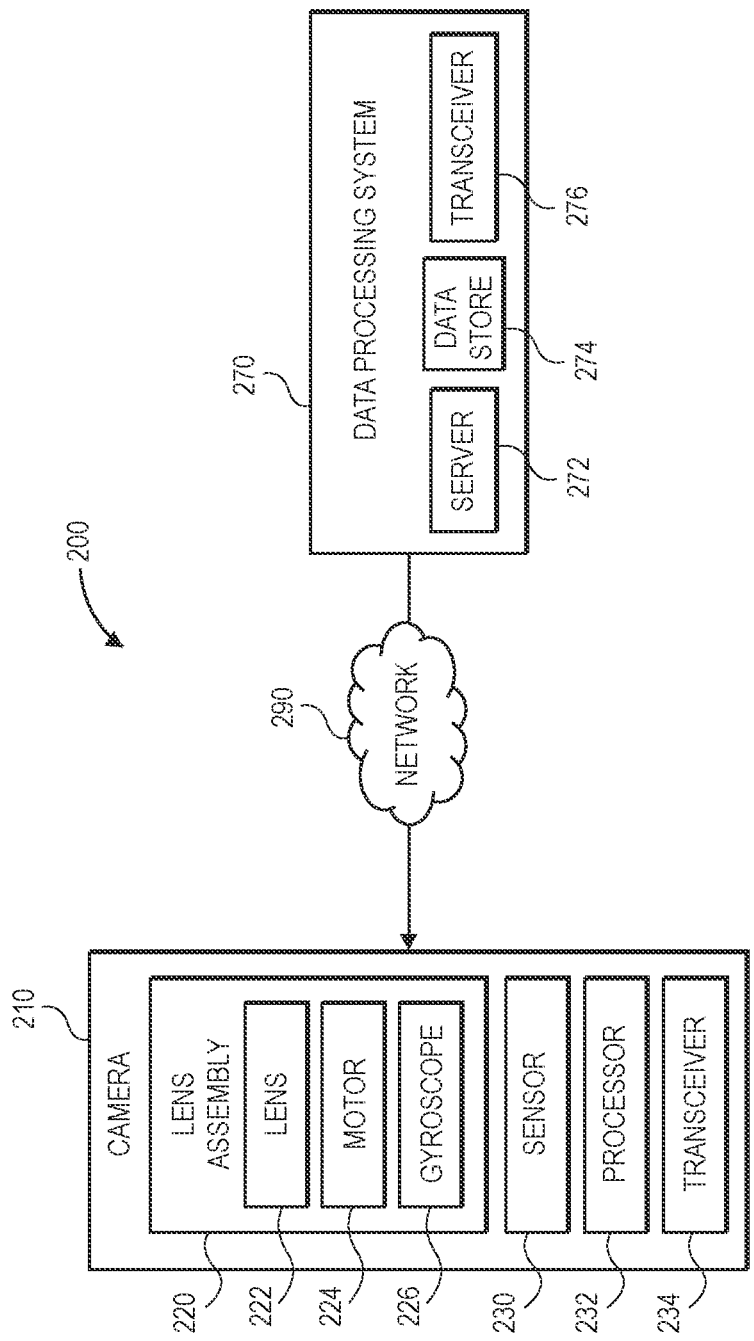
FIG. 2 is a block diagram of components of one system for targeted image stabilization in accordance with implementations of the present disclosure.

Referring to FIG. 2, a block diagram of components of one system for targeted image stabilization in accordance with implementations of the present disclosure is shown. Except where otherwise noted, reference numerals preceded by the number "2" shown in FIG. 2 indicate components or features that are similar to components or features having reference numerals preceded by the number "1" shown in FIGS. 1A through 1G.

As is shown in FIG. 2, a system 200 includes a camera 210 (or another imaging device) and a data processing system 270 that are connected to one another over one or more networks 290, which may include the Internet, in whole or in part.

The camera 210 may be any form of optical recording device that may be used to photograph or otherwise record imaging data of structures, facilities, terrain or any other elements appearing within a field of view. The camera 210 may include a lens assembly 220, one or more sensors 230, processors 232 and a transceiver 234, or any other component (not shown), such as one or more filters, chips, electrodes, clocks, boards, timers, power sources, connectors or any other relevant features (not shown).

The camera 210 may be configured to capture imaging data in the form of one or more still or moving images of any kind or form, as well as any relevant audio signals or other information. The camera 210 may also be independently adapted or otherwise configured to communicate with the data processing system 270 or any other external computer systems (not shown) by way of the network 290. The camera 210 may operate under the control of the processors 232 or any other processing unit (not shown) that may be accessible to the camera 210, e.g., over the networks 290.

The image sensors 230 may be or include one or more visual sensors (e.g., color or "RGB" sensors, grayscale sensors and/or black-and-white sensors), depth sensors, or any other sensors that are configured to capture visual imaging data (e.g., textures), depth imaging data (e.g., ranges) or any other imaging data regarding objects within one or more fields of view of the camera 210. For example, the image sensors 230 may be any sensors having single elements or a plurality of photoreceptors or photosensitive components (e.g., a CCD sensor, a CMOS sensor, or another sensor), which may be typically arranged in an array. Light reflected from objects within a field of view of the camera 210 may be captured by the image sensor 230, and quantitative values, e.g., pixels, may be assigned to one or more aspects of the reflected light. In some embodiments, the camera 210 may further include one or more illuminators (not shown), such as a laser system or a light-emitting diode (or "LED") for illuminating a portion of a scene appearing within a field of view of the camera 210 with light at any wavelength.

In some embodiments, the camera 210 may have both a depth sensor and an RGB sensor (or grayscale sensor or black-and-white sensor). Alternatively, the camera 210 may have just a depth sensor or just an RGB sensor. For example, the camera 210 may be an RGB color camera, a still camera, a motion capture/video camera or any other type or form of camera. In other implementations, the camera 210 may be depth-sensing cameras, such as an RGBz or RGBD camera. In still other implementations, the camera 210 may be a thermographic or infrared (IR) camera. Additionally, in some implementations, the camera 210 may simply be a camera module that includes a lens and an image sensor configured to convert an optical image obtained using the lens of the camera into a digital signal or digital representation of the image (generally referred to herein as imaging data).

The camera 210 may further include any other components (not shown) that may be required in order to capture, analyze and/or store imaging data. For example, the camera 210 may capture one or more still or moving images (e.g., streams of visual and/or depth image frames), along with any relevant audio signals or other information (e.g., position data), and may also connect to or otherwise communicate with the data processing system 270, or any other computer devices over the networks 290, through the sending and receiving of digital data by way of the transceiver 234 or directly.

In some embodiments, the processors 232 may be configured to select an exposure time or shutter speed for the camera 210. In some embodiments, the processors 232 may be configured to select an aperture or focal ratio for the camera 210. In some embodiments, the processors 232 may be configured to select a level of gain for the camera 210. In some embodiments, the processors 232 may be configured to execute one or more algorithms for automatically controlling the operation of the camera 210, including one or more algorithms for automatically selecting one or more of the exposure time or shutter speed, the aperture or focal ratio, or the gain of the camera 210, and operating the camera 210 with the selected exposure time or shutter speed, the selected aperture or focal ratio or the selected gain.

The processors 232 may also be configured to process imaging data captured by one or more of the image sensors 230, or take any other action. For example, in some embodiments, the processors 232 may be configured to identify one or more brightness or intensity levels or other attributes of images, or of select portions of images, captured by the camera 210 or any other imaging device (not shown), e.g., a histogram of brightness or intensities associated with one or more pixels. The processors 232 may further receive instructions from an external source, e.g., the data processing system 270, in identifying the select portions of the images for which brightnesses, intensity levels or other attributes are to be determined. In some embodiments, the processors 232 may execute one or more algorithms for automatically controlling the operation of the camera 210 based on selected exposure times or shutter speeds, selected apertures or focal ratios, or selected gains, as determined based on brightness or intensity levels or other attributes of images, or of select portions of images. In some other embodiments, the processors 232 may be configured to execute any other type or form of algorithm, including but not limited to machine learning algorithms, e.g., an artificial neural network.

The transceiver 234 enables the camera 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the networks 290 or directly. The transceiver 234 may further include or be in communication with one or more input/output (or "I/O") interfaces, network interfaces and/or input/output devices, and may be configured to allow information or data to be exchanged between one or more of the components of the camera 210, or to one or more other computer devices or systems (not shown) via the networks 290. For example, in some embodiments, the transceiver 234 may be configured to coordinate I/O traffic between the processors 232 and one or more onboard or external computer devices or components. The transceiver 234 may perform any necessary protocol, timing or other data transformations in order to convert data signals from a first format suitable for use by one component into a second format suitable for use by another component. In some embodiments, the transceiver 234 may include support for devices attached through various types of peripheral buses, e.g., variants of the Peripheral Component Interconnect ("PCI") bus standard or the USB standard. In some other embodiments, functions of the transceiver 234 may be split into two or more separate components, or incorporated directly into the processors 232.

In some embodiments, the transceiver 234 may transmit and/or receive signals according to the Bluetooth® Low Energy standard, e.g., within a frequency spectrum of approximately 2.4000 to 2.4835 gigahertz (GHz), and in two-megahertz (2 MHz) channels, or according to the Ultra-Wideband standard, e.g., within a frequency spectrum of approximately 3.1 to 10.6 gigahertz (GHz), with bandwidths of at least five hundred megahertz (500 MHz), or at least twenty percent of a center frequency. The transceiver 234 may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceiver 234 may be of any kind or type, and may be sent over the networks 290.

In some implementations, the camera 210 may be hard-mounted to a support or mounting that maintains the device in a fixed configuration or angle with respect to one, two or three axes. Alternatively, however, the camera 210 may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

The camera 210 may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

The camera 210 may also include manual or automatic features for modifying a field of view of the camera 210, or an orientation of the camera 210. For example, as is shown in FIG. 2, the lens assembly 220 includes one or more lenses 222, one or more motors 224 and one or more gyroscopes 226 (or other position sensors).

The lenses 222 may be one or more optical elements or devices for focusing light beams, e.g., onto surfaces of the sensor 230 or in any other location. The lenses 222 may be aligned or coaligned along a common axis (e.g., an optical axis) with respect to a housing or other structure or system.

The motors 224 may be servos or any other motors that are coupled to one or more of the lenses 222 and configured to move the lenses 222 within a plane that is normal to an optical axis of the lens assembly 220 or the camera 210, e.g., for image stabilization purposes.

In some implementations, such as where the lens assembly 220 includes a single lens 222, the motors 224 may be configured to move the single lens 222 in one or more directions within a plane normal to an optical axis of the lens assembly 220 or the camera 210. In some other implementations, such as where the lens assembly 220 includes multiple lenses, the motors 224 may be configured to move one of the lenses 222, and each of the other lenses 222 may remain stationary with respect to a housing or other structure of the lens assembly 220. Moreover, in some implementations, the lens assembly 220 may include a first motor 224 for moving one of the lenses 222 in a first direction within a plane normal to an optical axis, e.g., a z-axis, of the lens assembly 220 or the camera 210, e.g., along an x-axis, and a second motor 224 for moving the one of the lenses 222 in a second direction within the same plane, e.g., along a y-axis, with the first direction and the second direction being perpendicular to one another within that plane.

The gyroscopes 226 may be any mechanical or electrical device, component, system, or instrument for determining an orientation, e.g., an orientation of an optical axis of the lens assembly 220 or the camera 210. For example, the gyroscopes 226 may be traditional mechanical gyroscopes, each having at least a pair of gimbals and a flywheel or rotor. Alternatively, the gyroscopes 226 may be electrical components such as dynamically tuned gyroscopes, fiber optic gyroscopes, hemispherical resonator gyroscopes, London moment gyroscopes, microelectromechanical sensor gyroscopes, ring laser gyroscopes, or vibrating structure gyroscopes, or any other type or form of electrical component for determining an orientation of the lens assembly 220 or the camera 210. In some embodiments, the gyroscopes 226 may generate angular rate data in any direction or along or about any axis.

Alternatively, or in addition to the gyroscopes 226, the lens assembly 220 may further include one or more accelerometers, e.g., mechanical or electrical devices, components, systems, or instruments for sensing or measuring accelerations in any direction or along or about any axis, including but not limited to devices having one or more potentiometers, linear variable differential transformers, variable reluctance devices or piezoelectric components. Likewise, alternatively, or in addition to the gyroscopes 226, the lens assembly 220 may also include one or more compasses, or any devices, components, systems, or instruments adapted to determine one or more directions with respect to a frame of reference that is fixed with respect to the surface of the Earth (e.g., a pole thereof), such as one or more magnetometers or other electrical components for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall Effect magnetometer, or the like).

The data processing system 270 includes one or more physical computer servers 272 having one or more data stores 274 (e.g., databases) and any number of transceivers 276 associated therewith, and may be provided for any specific or general purpose. For example, the data processing system 270 of FIG. 2 may be independently provided for the exclusive purpose of receiving, analyzing or storing imaging data or other information or data received from the camera 210 or, alternatively, provided in connection with one or more physical or virtual services that are configured to receive, analyze or store such imaging data or other information or data, as well as to perform one or more other functions. In some implementations, the data processing system 270 may be associated with a materials handling facility, or any other physical or virtual facility.

The servers 272 may be connected to, communicate with, or include, the data stores 274 or the transceivers 276. The data stores 274 may store any type of information or data, including but not limited to imaging data, acoustic signals, information or data relating to the imaging data, or information or data regarding acoustic signals, environmental conditions, operational characteristics, or positions associated with the imaging data, which may be captured by the camera 210 or any other sensor and utilized for any purpose. The servers 272, the data stores 274 and/or the transceivers 276 may also connect to or otherwise communicate with the networks 290, through the sending and receiving of digital data. For example, the data processing system 270 may include any facilities, stations or locations having the ability or capacity to receive and store information or data, such as media files, in one or more data stores, e.g., media files received from the camera 210 from one or more other external computer systems (not shown) via the networks 290. In some implementations, the data processing system 270 may be provided in a physical location. In other such implementations, the data processing system 270 may be provided in one or more alternate or virtual locations, e.g., in a "cloud"-based environment.

The transceivers 276 enable the data processing system 270 to communicate through one or more wired or wireless means, e.g., wired technologies such as USB or fiber optic cable, or standard wireless protocols such as Bluetooth® or any Wi-Fi protocol, such as over the networks 290 or directly. The transceivers 276 may have one or more of the same attributes or characteristics of the transceiver 234 described above, or one or more other attributes, features or characteristics.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The data and/or computer-executable instructions, programs, firmware, software and the like (also referred to herein as "computer-executable" components) described herein may be stored on a computer-readable medium that is within or accessible by computers or computer components such as the processor 232 or the server 272, or any other computers or systems utilized by the camera 210 or the data processing system 270, and having sequences of instructions which, when executed by a processor (e.g., a central processing unit, or "CPU"), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

Although the system 200 of FIG. 2 includes a single box corresponding to a camera 210, those of ordinary skill in the pertinent arts will recognize that any number or type of cameras 210 each having any number of lenses 222 may be operated in accordance with the present disclosure, and in any type or form of environment, scene or facility, such as a materials handling facility. For example, in some implementations, the system 200 may include dozens or even hundreds of cameras 210 of any type or form, which may be mounted in regular or irregular configurations over or in association with a materials handling facility or other environment or scene in any manner.

Figure 3:
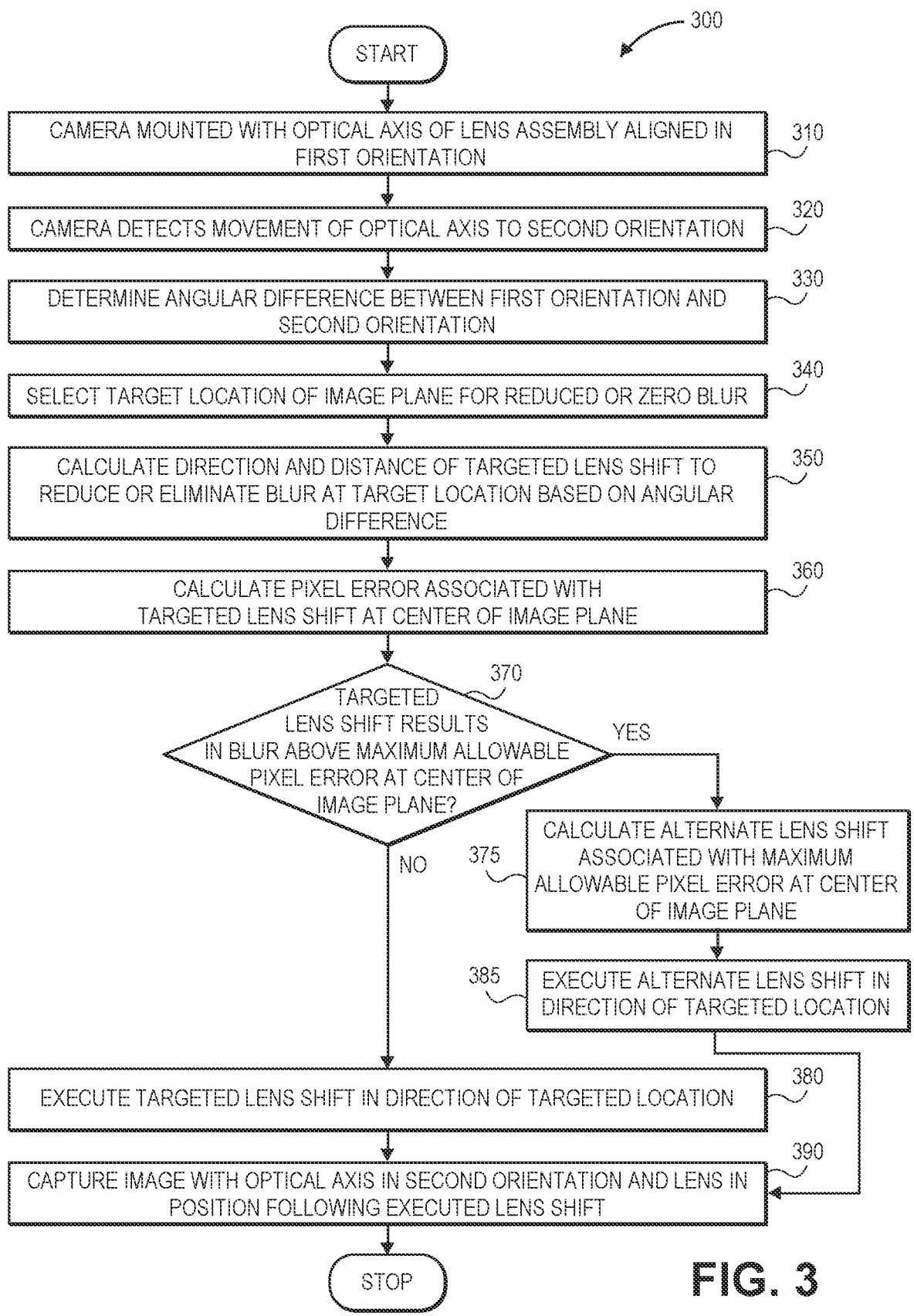
FIG. 3 is a flow chart of one process for targeted image stabilization in accordance with implementations of the present disclosure.

Referring to FIG. 3, a flow chart 300 representing one implementation of a process for targeted image stabilization in accordance with implementations of the present disclosure is shown.

At box 310, a camera is mounted with an optical axis of a lens assembly aligned in a first orientation. For example, the camera may be mounted with an optical axis that is aligned horizontally, vertically, or in any other orientation, and in any environment, scene or facility. In some implementations, the camera may be mounted above one or more inventory areas of a materials handling facility.

At box 320, the camera detects movement of the optical axis to a second orientation. For example, in some implementations, the camera or a lens assembly of the camera may be outfitted with one or more sensors such as gyroscopes to detect impacts, vibrations or other motions, and any resulting changes in orientation.

At box 330, an angular difference between the first orientation and the second orientation is determined. For example, the angular difference may be calculated with respect to any axis or standard, e.g., relative or absolute, or with respect to principal axes of the camera.

At box 340, a target location of an image plane is selected to achieve a reduced level of blur, or to eliminate blur (e.g., zero blur). For example, the location may be any portion of the image plane that is known or believed to correspond to one or more areas of interest of the environment, scene or facility where the camera is mounted, within a field of view of the camera. In some implementations, the target location is a location other than a center of the image plane.

At box 350, a direction and a distance of a targeted lens shift to reduce or eliminate blur at the target location is calculated based on the angular difference determined at box 330. For example, as is set forth above, a targeted lens shift may be calculated as a function of a focal length of the camera, an angle associated with the targeted location, the angular difference determined at box 330, such as according to Equation (1), above. The targeted lens shift may also be executed in a direction parallel to a line from the center of the image plane to the targeted location.

At box 360, a pixel error at a center of the image plane associated with the targeted lens shift determined at box 350 is determined. For example, as is set forth above, the pixel error (or pixel shift) corresponding to the targeted lens shift calculated at box 350 may be determined as a function of the focal length of the camera, the angular difference determined at box 330, or the distance of the targeted lens shift, such as according to Equation (2), above. The pixel error may be caused by the change in the orientation of the optical axis, or on any other basis.

At box 370, whether the pixel error determined at box 360 for the targeted lens shift would exceed a maximum allowable pixel error at the center of the image plane is determined. For example, in some implementations, a maximum allowable pixel error may be a threshold or standard that is calculated or established for the camera in general or for an application in which the camera is being utilized in particular. In some implementations, the maximum allowable pixel error may be determined or established as a number of pixels from the center, or as a distance from the center. Additionally, in some implementations, one or more applications in which the camera is utilized may have different maximum allowable pixel errors, depending on operational requirements of the camera, standards or limits on clarity or precision, or on any other basis.

If the targeted lens shift would result in a pixel error that exceeds the maximum allowable pixel error at the center of the image plane, then the process advances to box 375, where an alternate lens shift associated with the maximum allowable pixel error at the center of the image plane is calculated. For example, where shifting the lens by the amount and in the direction determined at box 350 would create an unacceptable level or amount of blur at the center of the image plane, the alternate lens shift may be calculated as a function of the focal length of the camera, the angular difference determined at box 330, and the maximum allowable pixel error, such as according to Equation (3), above.

At box 385, the alternate lens shift calculated at box 375 is executed in the direction determined at box 350. For example, where a lens assembly includes one or more lenses that are coupled to servos or other motors and aligned to move in one or more directions within a plane perpendicular to the optical axis, or a z-axis, e.g., in directions of an x-axis and ay-axis, the servos or other motors may be configured to cause the lenses to move a distance of the lens shift calculated at box 375 and in a direction parallel to a line from the center of the image plane to the target location selected at box 340, independently or in concert with one another.

If the targeted lens shift would not result in a pixel error that exceeds the maximum allowable pixel error at the center of the image plane, then the process advances to box 380, where the targeted lens shift determined at box 370 is executed in the direction of the target location of the image plane.

At box 390, an image is captured with the optical axis in the second orientation and the lens in the position following the targeted lens shift executed at box 380 or the alternate lens shift executed box 385, and the process ends.

Referring to FIGS. 4A through 4G, views of aspects of one process for targeted image stabilization in accordance with implementations of the present disclosure are shown. Except where otherwise noted, reference numerals preceded by the number "4" shown in FIGS. 4A through 4G indicate components or features that are similar to components or features having reference numerals preceded by the number "2" shown in FIG. 2 or by the number "1" shown in FIGS. 1A through 1G.

Figure 4A:
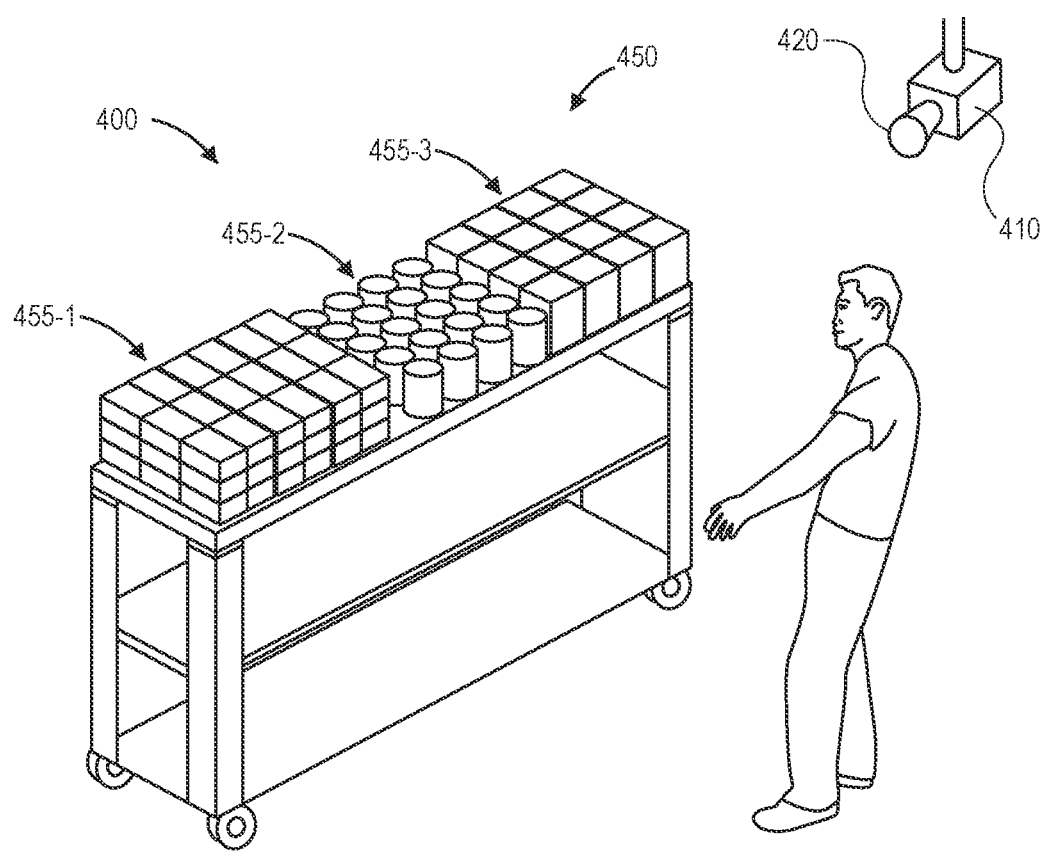

As is shown in FIG. 4A, a system 400 includes a camera (or another imaging device) 410 provided in an environment, a scene or a facility as a materials handling facility, a fulfillment center, a warehouse, or any other like facility, and an inventory storage unit 450 (e.g., a set of inventory shelves), or an inventory storage area, having a plurality of sets of items 455-1, 455-2, 455-3 in designated item spaces or locations on the inventory storage unit 450. The environment, the scene or the facility in which the camera 410 is mounted may be any open or enclosed environment or space in which any number of actors (e.g., humans, other animals or machines) may execute one or more poses, gestures, movements or other interactions within a field of view of the camera 410.

The camera 410 includes a lens assembly 420 having any number of lenses, memory or storage components, photosensitive surfaces, filters, chips, electrodes, clocks, boards, timers, power sources, connectors or any other components. Although the system 400 of FIG. 4A includes only a single camera 410, one or more other cameras 410 (not shown) may be mounted in a similar manner to the camera 410 in the environment, the scene or the facility, in any location or orientation with respect to one another, and such cameras 410 may be installed or otherwise operated independently or as components of a camera network (or an imaging device network). For example, the camera 410 may be in communication with one or more computer devices or systems (not shown), e.g., over one or more computer networks, and such devices or systems may include one or more databases or other data stores having information regarding attributes that are, have been or might be stored on the inventory storage unit 450, e.g., one or more of the sets of items 455-1, 455-2, 455-3.

The camera 410 may be configured to capture visual images (e.g., color, grayscale, or black-and-white images), or any other type or form of imaging data (e.g., depth images). In some implementations, the camera 410 may include one or more sensors that are configured to capture visual imaging data at relatively high levels of resolution, e.g., eight to nine megapixels per image, and at relatively high frame rates, e.g., fifteen or more frames per second (fps). Such sensors may include arrays of photodetectors or photosensitive components such as CCD sensors, CMOS sensors, photodiodes, or the like. Such sensors may capture light scattered or reflected from objects and assign one or more quantitative values (e.g., red, green, blue or other color values, or distances or ranges to such objects) to aspects of the scattered or reflected light. Alternatively, or additionally, in some implementations, the camera 410 may be configured to capture any other imaging data, such as depth imaging data, or visual imaging data at any levels of resolution or frame rates. Additionally, in some implementations, the camera 410 may be self-powered, e.g., by one or more power sources internal to or onboard the camera 410, such as batteries or fuel cells. In some other implementations, however, the camera 410 may receive alternating current (or AC) or direct current (or DC) power from one or more external power sources, e.g., by one or more conductors or other connectors. For example, the camera 410 may receive power by a dedicated connection to external devices or systems, or power sources, e.g., according to a Power over Ethernet (or "PoE") or a USB standard or system that may also be utilized to transfer information or data to or from the camera 410.

As is shown in FIG. 4B, the lens assembly 420 includes a lens 422 that may be provided within a housing 425 or structure configured for coupling with a frame or structure of the camera 410, in alignment with an image sensor 430 of the camera 410. As is further shown in FIG. 4B, the lens 422 is coaligned along an optical axis in a first orientation $O_1$ with a center of the image sensor 430. The lens 422 may be any type or form of optical element or device for focusing light beams onto surfaces of the image sensor 430, which may be a CCD sensor, a CMOS sensor, or any other sensor having a plurality of photoreceptors or photosensitive components that are typically arranged in an array.

Figure 4C:
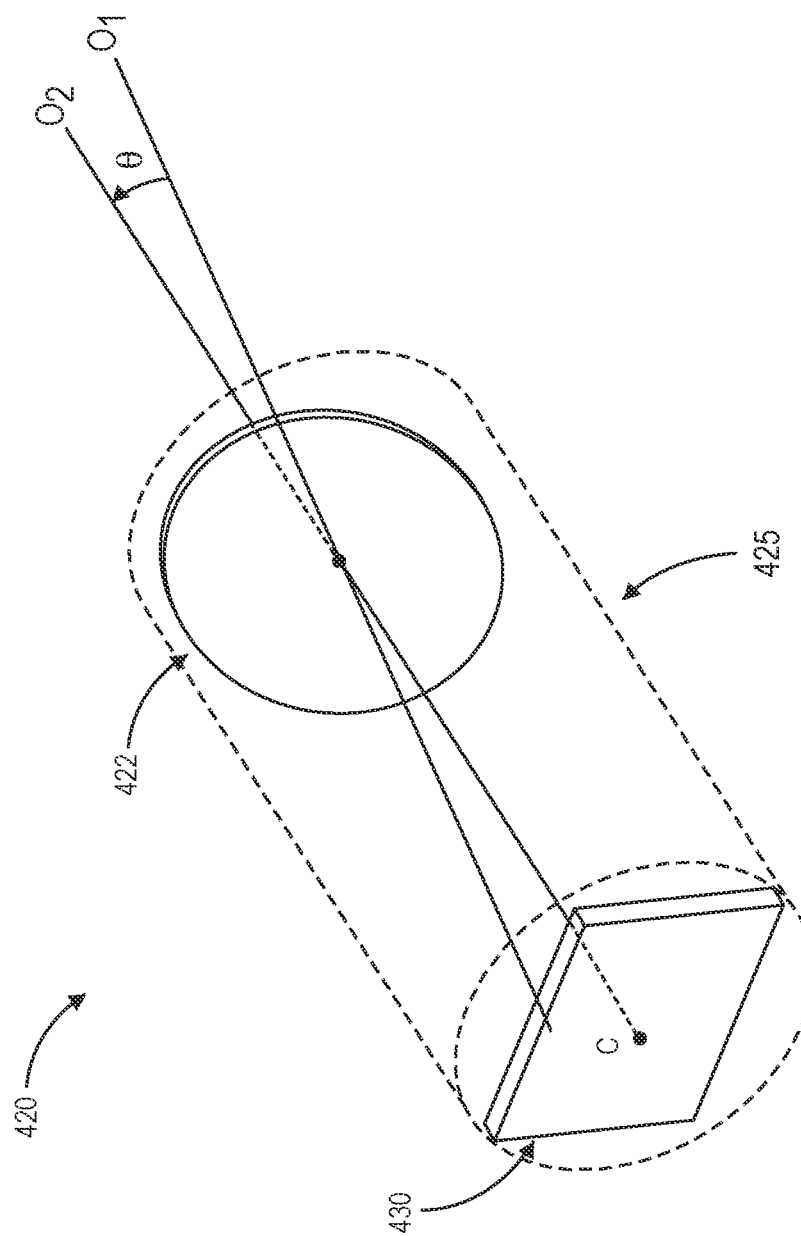
Figure 4D:
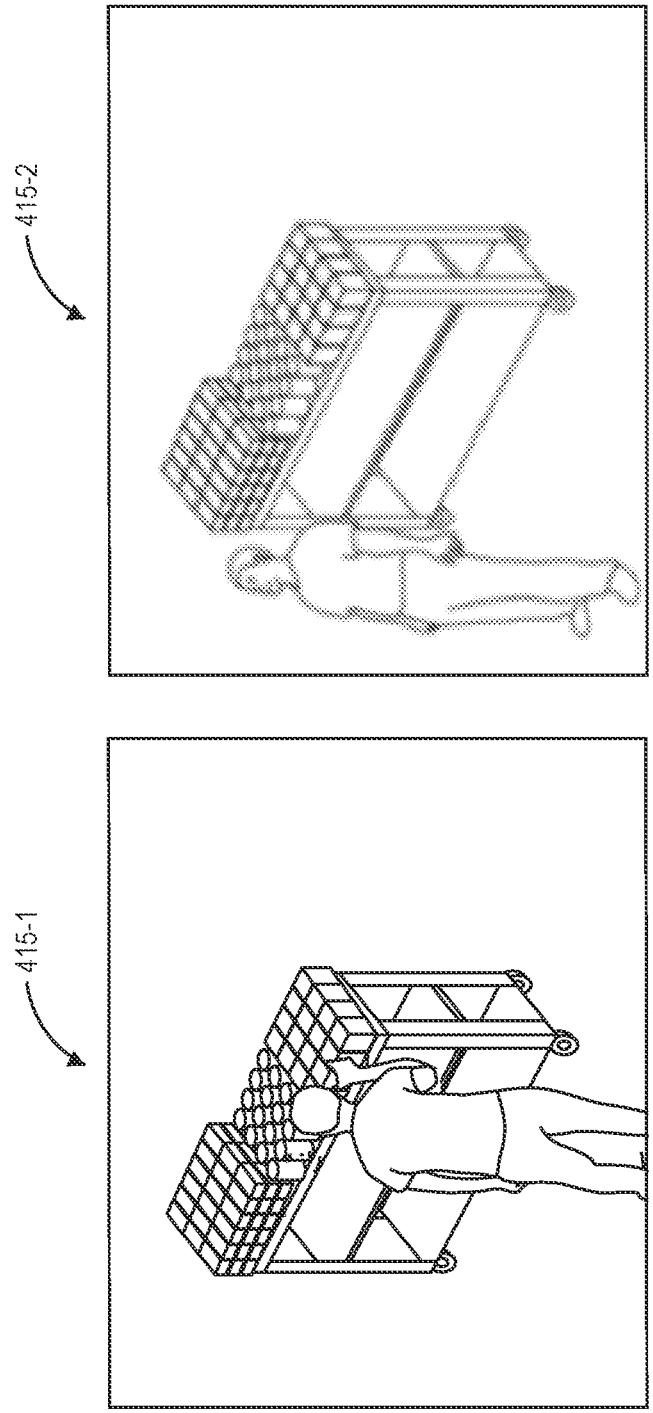

As is shown in FIG. 4C, the lens assembly 420 may be caused to be aligned with an optical axis in a second orientation $O_2$, which is provided at an angle $\theta$ with respect to the first orientation $O_1$, in response to one or more impacts, vibrations or other movements of the camera 410. As is shown in FIG. 4D, as compared to a first image 415-1 captured prior to the movement that caused the lens assembly 420 to be aligned with the optical axis in the second orientation $O_2$, a second image 415-2 captured after the movement of the lens assembly 420 is subjected to blurring or other adverse effects.

Figure 4E:
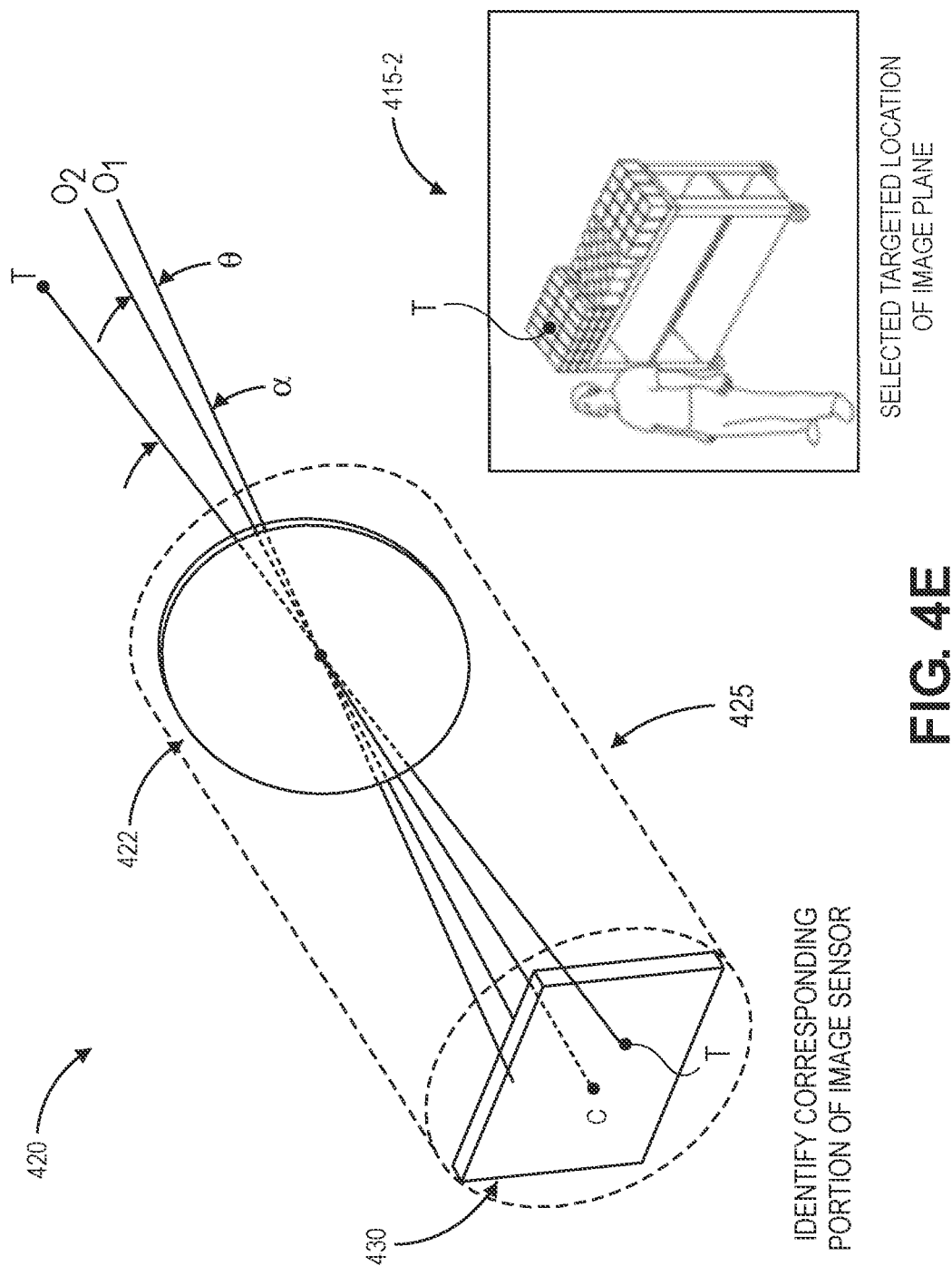

In accordance with implementations of the present disclosure, blurring or other adverse effects resulting from a movement of a lens assembly of a camera at a targeted location of an image plane may be minimized or eliminated by calculating and executing a lens shift based on an extent of the movement and an angle to the targeted location. For example, as is shown in FIG. 4E, with the lens assembly 420 aligned with the optical axis in the second orientation $O_2$, a targeted location T of the image plane may be identified as associated with a portion of the image 415-2 depicting items of high importance, e.g., one or more of the sets of items 455-1, 455-2, 455-3 on the inventory storage unit 450.

Figure 4F:
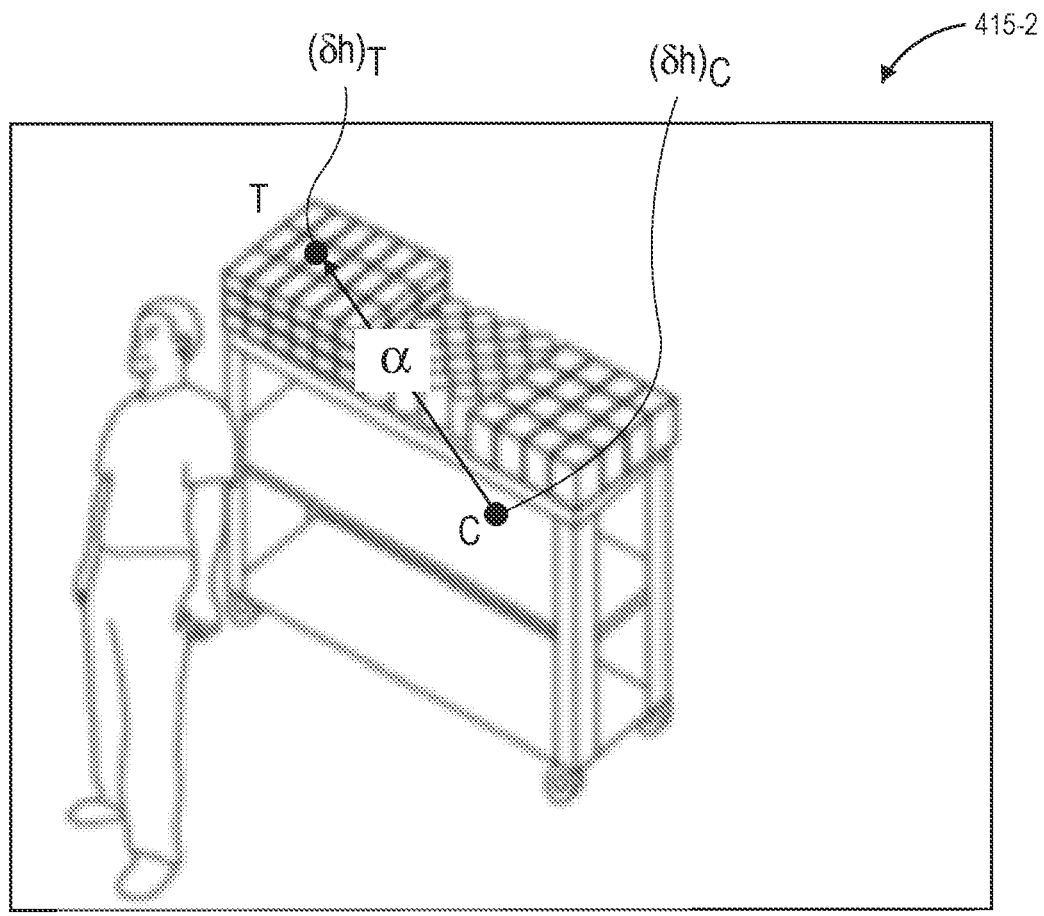

As is shown in FIG. 4F, a targeted lens shift $(\Delta L)_T$ that would result in a blur $\delta h_T$ (or pixel shift) at the targeted location T of the image 415-2 having a value of zero may be calculated as a function of a focal length of the camera 410, an angle corresponding to the targeted location T, and an angular difference between the optical axis in the first orientation $O_1$ and the optical axis in the second orientation $O_2$, such as according to Equation (1), above. A blur $\delta h_C$ (or pixel shift) at a center C of the image 415-2 that would result from the targeted lens shift $(\Delta L)_T$ may also be calculated, such as according to Equation (2) above, and compared to a maximum allowable level of blur (or pixel shift) at the center C of the image 415-2, or $C_{MAX}$. If the blur $\delta h_C$ at the center C of the image 415-2 would exceed the maximum allowable level of blur (or pixel shift) at the center C, or $C_{MAX}$, then an alternate lens shift $(\Delta L)_C$ may be calculated as a function of a focal length of the camera 410, and an angular difference between the first orientation $O_1$ and the second orientation $O_2$, as well as the maximum allowable level of blur (or pixel shift) at the center C, or $C_{MAX}$, such as according to Equation (3) above.

Figure 4G:
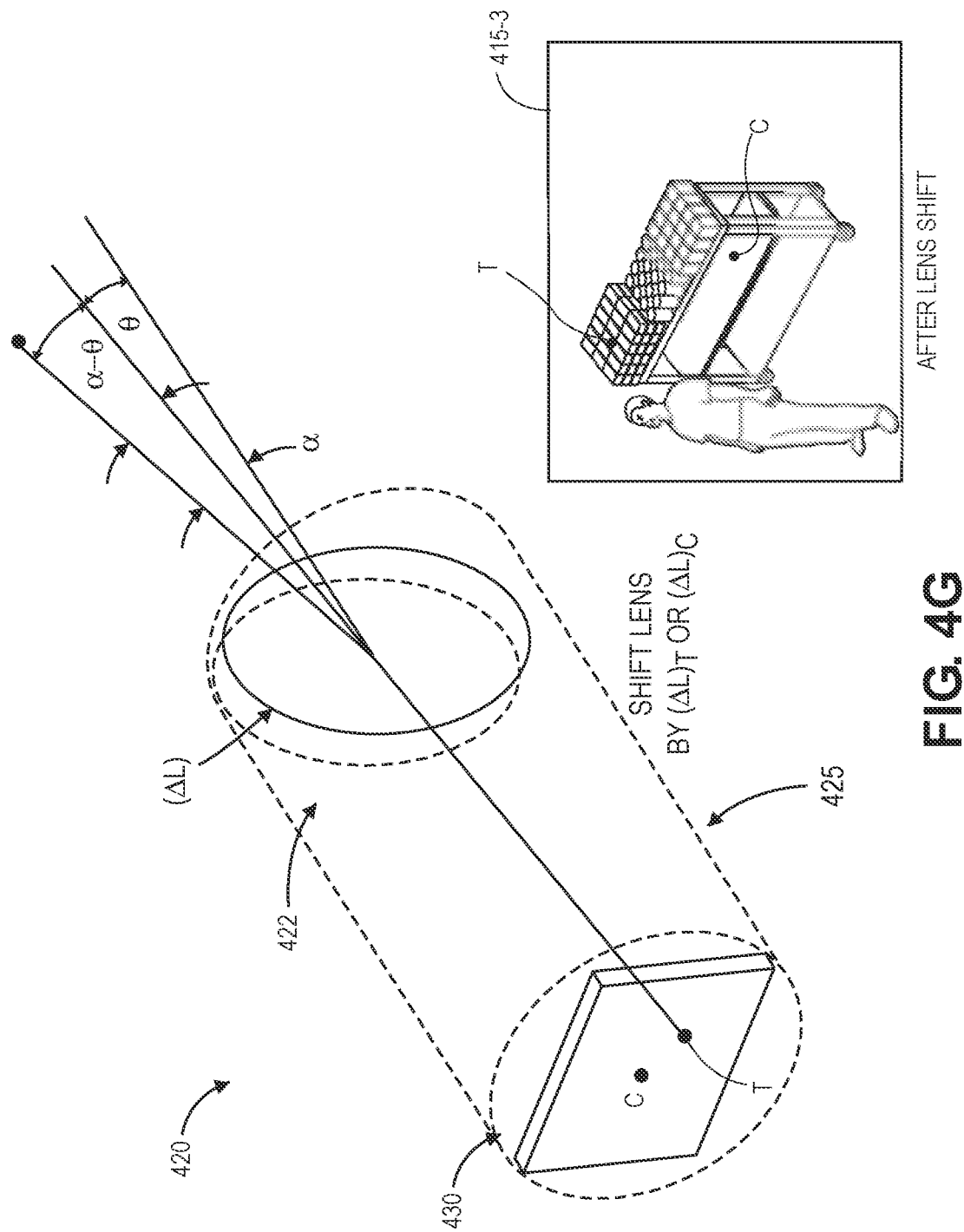

As is shown in FIG. 4G, a shift $(\Delta L)$ of the lens 422, viz., either the targeted lens shift $(\Delta L)_T$ or the alternate lens shift $(\Delta L)_C$, may be implemented to minimize or eliminate blur (or pixel shift) at the targeted location T, and to reduce blur or pixel shift at the center C of the image plane. An image 415-3 captured following the shift of the lens 422 may have zero blur, or a substantially reduced level of blur, at the targeted location T, while blur at the center C of the image plane may likewise be reduced, and not greater than maximum allowable level of blur (or pixel shift) at the center C, or $C_{MAX}$.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An imaging device comprising:
   a lens assembly comprising:
   a first lens;
   a first motor configured to translate the first lens in a first direction normal to an optical axis defined by the lens assembly; and
   a second motor configured to translate the first lens in a second direction normal to the optical axis, wherein the second direction is normal to the first direction;
   an imaging sensor having a photosensitive surface with a plurality of pixel sensors;
   a first motion sensor configured to detect motion in the first direction;
   a second motion sensor configured to detect motion in the second direction;
   at least one memory device; and
   at least one computer processor,
   wherein the at least one computer processor is configured to at least:
      determine that the optical axis is aligned in a first angular orientation at a first time;
      determine, based at least in part on data captured by one or more of the first motion sensor or the second motion sensor, that the optical axis is aligned in a second angular orientation at a second time;
      select a first location in an image plane of the imaging device, wherein the first location is other than a center of the image plane;
      determine an angular difference between the first angular orientation and the second angular orientation;
      calculate a distance for moving the first lens in at least one of the first direction or the second direction based at least in part on a focal length of the camera, an angle corresponding to the first location of the image plane with respect to the optical axis, and the angular difference;
      cause the first lens to move by the distance in the at least one of the first direction or the second direction; and
      after causing the first lens to move by the distance, capture at least one image.

2. The imaging device of claim 1, wherein the at least one computer processor is further configured to at least:
   calculate a pixel shift at the center of the image plane with the first lens moved by the distance, wherein the pixel shift at the center of the image plane is calculated based at least in part on the focal length of the camera, the angular difference, and the distance; and
   determine that the pixel shift at the center of the image plane is less than a maximum pixel shift at the center of the image plane,
   wherein the first lens is caused to move by the distance in the at least one of the first direction or the second direction in response to determining that the pixel shift at the center of the image plane is less than the maximum pixel shift at the center of the image plane.

3. The imaging device of claim 1, wherein the distance is calculated according to an equation $(\Delta L)_T = f \cdot \tan(\alpha - \theta) - f \cdot \tan \theta$,
   wherein f is the focal length of the camera,
   wherein $\alpha$ is the angle corresponding to the first location of the image plane with respect to the optical axis,
   wherein $\theta$ corresponds to the angular difference, and
   wherein $(\Delta L)_T$ is the distance.

4. A computer-implemented method comprising:
   determining that a lens assembly of a camera has moved from a first state to a second state, wherein an optical axis of the lens assembly was aligned in a first orientation with the lens assembly of the camera in the first state, and wherein the optical axis is aligned in a second orientation with the lens assembly of the camera in the second state;

determining an angular difference between the first orientation and the second orientation;

selecting a portion of an image plane of the camera, wherein the portion of the image plane does not include a center of the image plane;

calculating a first distance for moving at least a first lens of the lens assembly within a plane normal to the optical axis based at least in part on a focal length of the camera, an angle corresponding to the portion of the image plane with respect to the optical axis, and the angular difference, wherein moving the first lens by the first distance within the plane normal to the optical axis would result in a first pixel shift of zero at the portion of the image plane;

calculating a second pixel shift at the center of the image plane associated with moving the first lens by the first distance;

selecting a second distance for moving at least the first lens within the plane normal to the optical axis based at least in part on the first distance, the second pixel shift and a maximum pixel shift at the center of the image plane;

moving the first lens from a first position within the plane normal to the optical axis to a second position within the plane normal to the optical axis, wherein the first position and the second position are separated by the second distance; and capturing at least a first image by the camera with the first lens in the second position within the plane normal to the optical axis.

5. The computer-implemented method of claim 4, wherein selecting the second distance comprises:

determining that the second pixel shift is not greater than the maximum pixel shift, wherein the second distance is approximately equal to the first distance.

6. The computer-implemented method of claim 4, wherein the first distance is calculated according to an equation $(\Delta L)_T = f \cdot \tan(\alpha - \theta) - f \cdot \tan \theta$, wherein f is the focal length of the camera, wherein $\alpha$ is the angle corresponding to the portion of the image plane with respect to the optical axis, wherein $\theta$ corresponds to the angular difference between the first orientation and the second orientation, and wherein $(\Delta L)_T$ is the first distance.

7. The computer-implemented method of claim 4, wherein the second pixel shift is calculated according to an equation $\delta h_C = f \cdot \tan \theta - (\Delta L)_T$, wherein f is the focal length of the camera, wherein $\theta$ corresponds to the angular difference between the first orientation and the second orientation, wherein $(\Delta L)_T$ is the first distance, and wherein $\delta h_C$ is the second pixel shift.

8. The computer-implemented method of claim 4, wherein selecting the second distance comprises:

determining that the second pixel shift is greater than the maximum pixel shift; and in response to determining that the second pixel shift is greater than the maximum pixel shift, calculating the second distance for moving at least the first lens within the plane normal to the optical axis based at least in part on the focal length of the camera, the angular difference, and the maximum pixel shift.

9. The computer-implemented method of claim 8, wherein the second distance is calculated according to an equation $(\Delta L)_C = f \cdot \tan \theta - C_{MAX}$, wherein f is the focal length of the camera, wherein $\theta$ corresponds to the angular difference between the first orientation and the second orientation, wherein $C_{MAX}$ is the maximum pixel shift at the center of the image plane, and wherein $(\Delta L)_C$ is the second distance.

10. The computer-implemented method of claim 4, wherein the lens assembly comprises the first lens, at least one gyroscope and at least one motor disposed within a common housing.

11. The computer-implemented method of claim 10, wherein that the lens assembly of the camera has moved from the first state to the second state is determined by the at least one gyroscope.

12. The computer-implemented method of claim 10, wherein the first lens is moved from the first position within the plane normal to the optical axis to the second position within the plane normal to the optical axis by the at least one motor.

13. The computer-implemented method of claim 12, wherein the at least one motor comprises a first servo motor configured to move at least the first lens in a first direction normal to the optical axis and a second servo motor configured to move at least the first lens in a second direction normal to the optical axis, and wherein the first direction is normal to the second direction.

14. The computer-implemented method of claim 4, wherein the camera further comprises an image sensor, wherein a center of the image sensor is coaligned with the optical axis of the lens assembly in the first state, and wherein the image sensor is one of a charge coupled device sensor or a complementary metal oxide semiconductor sensor.

15. The computer-implemented method of claim 4, wherein the first lens is moved from the first position within the plane normal to the optical axis to the second position in a direction parallel to a line from the center of the image plane to the portion of the image plane.

16. The computer-implemented method of claim 4, wherein the maximum pixel shift at the center of the image plane is five pixels.

17. The computer-implemented method of claim 4, wherein the camera is mounted in a materials handling facility and includes at least a portion of an inventory area within a field of view.

18. An imaging device comprising:

a lens assembly comprising a first lens;

a first motor configured to translate the first lens in a first direction normal to an optical axis of the lens assembly;

a second motor configured to translate the first lens in a second direction normal to the optical axis of the lens assembly, wherein the second direction is normal to the third direction;

an imaging sensor having a photosensitive surface with a plurality of pixel sensors;

a first motion sensor configured to detect motion in the first direction;

a second motion sensor configured to detect motion in the second direction;

at least one memory device; and at least one computer processor, wherein the at least one computer processor is configured to at least:

determine that the optical axis is aligned in a first angular orientation at a first time;

determine, based at least in part on data captured by one or more of the first motion sensor or the second motion sensor, that the optical axis is aligned in a second angular orientation at a second time;

select a first location in an image plane of the imaging device, wherein the first location is other than a center of the image plane;

determine an angular difference between the first angular orientation and the second angular orientation;

calculate a first distance for moving the first lens in at least one of the first direction or the second direction based at least in part on a focal length of the camera, an angle corresponding to the first location of the image plane with respect to the optical axis, and the angular difference;

calculate a first pixel shift at the center of the image plane associated with moving the first lens by the first distance;

determine that the first pixel shift at the center of the image plane is greater than a maximum allowable pixel shift at the center of the image plane;

calculate a second distance for moving the first lens in the at least one of the first direction or the second direction based at least in part on the focal length of the camera, the angular difference and the maximum allowable pixel shift at the center of the image plane;

cause the first lens to move by the second distance in the at least one of the first direction or the second direction; and after causing the first lens to move by the second distance, capture at least one image.

19. The imaging device of claim 18, wherein the first lens is moved from a first position within a plane normal to the optical axis to a second position within the plane normal to the optical axis in a direction parallel to a line from the center of the image plane to the first location in the image plane.

20. The imaging device of claim 18, wherein the second distance is calculated according to an equation $(\Delta L)_C = f \cdot \tan \theta - C_{MAX}$, wherein f is the focal length of the camera, wherein $\theta$ corresponds to the angular difference, wherein $C_{MAX}$ is the maximum allowable pixel shift at the center of the image plane, and wherein $(\Delta L)_C$ is the second distance.

* * * * *